United States Patent Office.

LOUIS FITZMAIER, OF NEW YORK, N. Y., ASSIGNOR TO ATWATER, BENHAM & COMPANY.

Letters Patent No. 67,184, dated July 30, 1867; reissue No. 4,160, dated October 25, 1870.

IMPROVEMENT IN METHODS OF ORNAMENTING TIN, &c.

The Schedule referred to in these Letters Patent and making part of the same.

*To all whom it may concern:*

Be it known that I, LOUIS FITZMAIER, of the city, county, and State of New York, have invented a new and improved Method of Ornamenting Tin, or other metal plates, and articles made therefrom; and I do hereby declare the following to be a full and exact description thereof.

The nature of my invention consists in transferring any desired drawing from a lithographic stone on paper, and from thence on the tin or other metal plates or articles, by using a certain process hereinafter described.

To enable others skilled in the art to make and use my invention, I will proceed to describe its construction and operation.

The drawing which I wish to transfer is first made on a lithographic stone by means of lithographic ink or chalk. It is blackened and etched in the usual manner.

I then take paper, and prepare the same like the usual lithographic transforming-paper, by taking three parts of flour, one part of starch, and some water. I then boil this mixture, and pour more water into it, until a fluid is obtained which, when cooled, may be transferred by a brush.

I then transfer this mixture evenly, by a brush, on one side of the paper, and leave it there until it dries, when I plait it on the other side by a hot plaiting-iron, in the same manner in which starched linen is plaited.

I then take a composition consisting of about two parts No. 3 lithographic varnish, one part No. 1 lithographic varnish, one-half part calcined magnesia, one-half part chrome-yellow, well mixed and rubbed together.

The black color from the stone is then removed by turpentine, and this yellowish mixture is then uniformly rubbed over the drawing on the lithographic stone by means of a hand-roller, whereby the strongly marked parts of the drawing receive no more of said mixture than the finer parts of the same.

I then obtain a yellow impression from the stone on prepared paper.

After obtaining an impression from the drawing of the lithographic stone, I put gold foil, or silver foil, or any other metal foil or leaf over the impression, after having removed the paper from the stone.

I then again rub the stone uniformly with the said yellowish mixture, and again place a second sheet of prepared paper on the same, on the top of which I place the said first impression prepared with gold foil, or silver foil, or gold leaf, or silver leaf, or any other metal foil or leaf, and draw both the first impression and the prepared paper through a usual lithographic press.

When I desire a shaded design, the second impression must be on transparent paper.

I now mix Demar varnish, boiled linseed-oil, and turpentine, and wet the tin or other metal plate or article to be ornamented with this mixture, uniformly over the whole surface.

I then put on the said tin, &c., that side of the first impression on which the gold or silver or other metal foil or leaf is. The other side of said impression I moisten with water.

I then roll over the moist side of the paper by a wooden flannel-covered hand-roller, and then withdraw the paper from the metal, when the gilded or silvered impression will have remained clearly and distinctly on the surface of the tin, or other plate or article.

Having thus described my invention,

What I claim as new, and desire to secure by Letters Patent, is—

1. The process, substantially as described, of transferring any desired drawing from a lithographic stone on paper, and from thence on tin or other metal.

2. Ironing prepared paper on its back side by means of a hot plaiting-iron, for the purpose of obtaining a straight and glossy appearance of the same, substantially in the manner and for the purpose described.

3. The use of a composition consisting of lithographic varnish and chrome-yellow, substantially in the manner and for the purpose described.

4. Rolling over the moist side of the paper by a wooden flannel-covered hand-roller, whereby a uniform impression of the drawing is produced on the tin, &c., substantially as described.

LOUIS FITZMAIER.

Witnesses:
CHAS. WEHLE,
CHAS. GOLDZIER.